D. M. BLISS.
ALTERNATING CURRENT RECTIFIER.
APPLICATION FILED JUNE 7, 1912.
1,234,440.
Patented July 24, 1917.
2 SHEETS—SHEET 1.
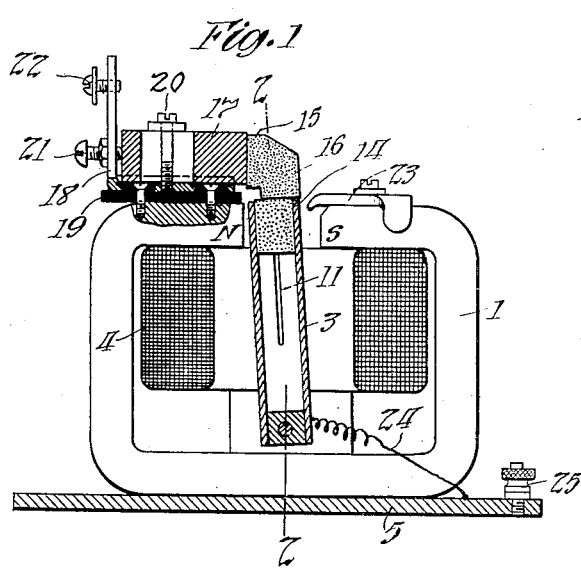
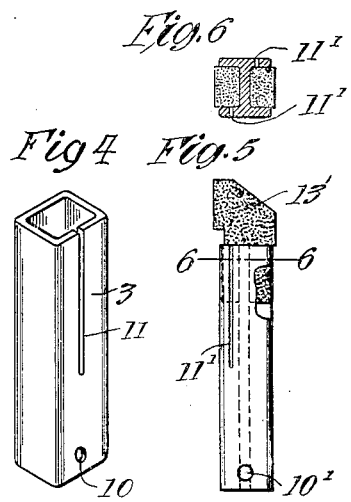
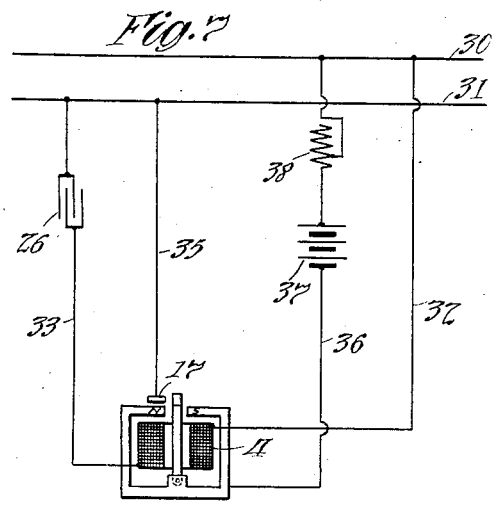
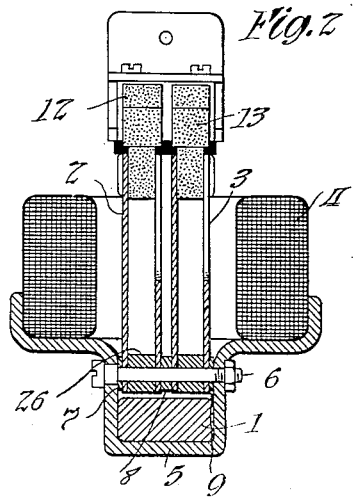
Witnesses:
Frank D. Lewis
Henry Lanahan
Inventor:
Donald M. Bliss
by Frank L. Dyer
his Atty.

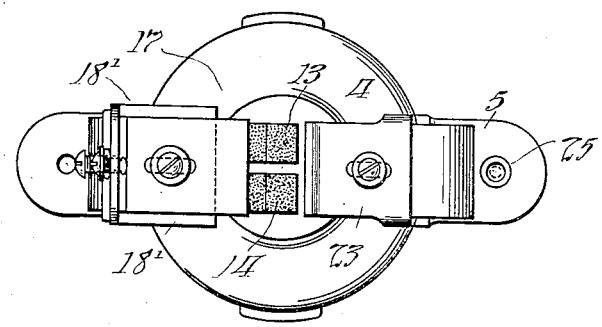
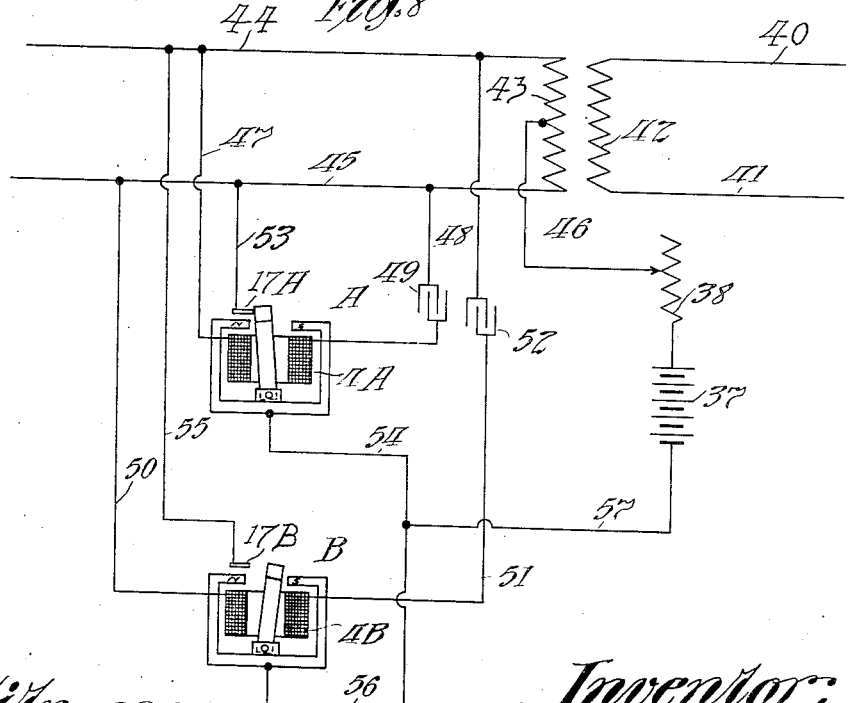

UNITED STATES PATENT OFFICE.

DONALD M. BLISS, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

ALTERNATING-CURRENT RECTIFIER.

1,234,440.  Specification of Letters Patent.  Patented July 24, 1917.

Application filed June 7, 1912. Serial No. 702,159.

*To all whom it may concern:*

Be it known that I, DONALD M. BLISS, a subject of the King of Great Britain, and a resident of West Orange, in the county of Essex and State of New Jersey, have invented certain new and useful Improvements in Alternating-Current Rectifiers, of which the following is a specification.

My invention relates to alternating current rectifiers and rectifying systems, and more particularly to that type of such rectifiers in which vibrating contacts are employed to open and close a circuit or circuits connected to a source of alternating current and to a direct current translating device devices in such a manner as to cause the current impulses to pass into the direct current translating device or devices in one direction only. The object of my invention is to improve and render more efficient apparatus and systems of this class.

One feature of my invention consists in an improved construction of the vibrating armature and the manner of mounting the same, whereby extreme lightness and sensitiveness are obtained, and in which the armature has no natural tendency to vibrate at a fixed rate, and is consequently perfectly free to follow variations in the alternating current to be rectified. I prefer to use carbon for the vibrating contacts, since thereby the current carrying capacity is increased, sparking is reduced, and sticking of contacts avoided. Another feature of my invention consists in an improved manner of mounting the carbon contact upon the armature, which permits the contact to be readily removed and renewed when found necessary or desirable. My invention consists also in a rectifying system including vibrating rectifiers in which both half waves of alternating current are utilized.

For the further description of my invention, reference is had to the drawings which accompany and form a part of this specification, and in which—

Figure 1 is a side elevation, partly in section, of one embodiment of my improved rectifier;

Fig. 2 is a section on the line 2—2 of Fig. 1;

Fig. 3 is a plan view of the rectifier illustrated in Fig. 1;

Fig. 4 is a perspective view of one form of my improved armature;

Fig. 5 is a side elevation of another form of my improved armature and contact, with a portion of the armature broken away to show the carbon contact;

Fig. 6 is a section on the line 6—6 of Fig. 5;

Fig. 7 is a diagrammatic view showing my improved rectifier connected to an alternating current circuit and supplying unidirectional current to a storage battery; and Fig. 8 is a diagrammatic view showing a system in which my improved rectifiers are employed and in which both half waves of alternating current are utilized.

Referring to the drawings, at 1 is shown a permanent magnet having an almost completely closed magnetic circuit. In the gap between the north and south poles of the permanent magnet 1, one or more armatures 2 and 3, preferably made of soft iron, are located. Surrounding the armatures 2 and and 3 an actuating coil 4 is provided. The permanent magnet 1, armatures 2 and 3, and coil 4 are supported in any suitable manner, as by means of a frame or base 5. The armatures 2 and 3 are mounted so as to be capable of vibration in the gap of the permanent magnet 1, and are preferably pivotally mounted at their lower ends upon a pivot 6 supported in the frame 5. Spacing blocks 7, 8 and 9 are provided on the pivot 6 to space the armatures from the frame 5 and from each other. The armatures are of elongated form, and have relatively thin walls, thereby combining lightness and efficient flux carrying capacity. The armatures illustrated in Figs. 1, 2, 3 and 4 are tubular and at their lower ends are provided with openings 10 in each of two opposite walls to receive the pivot 6. A plug 26 is preferably driven into the lower end of each of the tubular armatures, having a hole registering with the openings 10, and affording a better bearing for the pivot 6. One or more of the walls is preferably slotted, the slot extending from the upper open end throughout a portion of the wall and toward the lower end, as is shown at 11. Graphite or carbon contacts 12 and 13 are provided which are adapted to be inserted into the upper open ends of the armatures 2 and 3. Each carbon contact is preferably formed with a portion 14 adapted to fit into the upper open end of each armature, and with an upper portion having a contact face 15 adapted to coöperate with a stationary contact 17. The slot 11 permits the opening in the upper end of the armature to be slightly increased, so that the portion 14 of the contact may be inserted therein, and the contact is held firmly in place in the armature by the resiliency of the material of the armature. Shoulders 16 are provided on each contact which engage the upper end of the armature when the contact is inserted therein and limit the extent to which the contact enters the armature. The contact faces of the carbon contacts 12 and 13 coöperate with a stationary contact 17 which is preferably adjustably mounted upon one pole of the permanent magnet 1 and insulated therefrom. The contact 17 may be in the form of a block slidably adjustable on an L-shaped member 18 secured to the permanent magnet 1 and insulated therefrom and provided with guides 18' on the surface of its horizontal arm for the reception of the contact block 17. The horizontal arm of the member 18 is secured to the permanent magnet 1 by countersunk screws or other suitable means and insulated therefrom by an insulating plate 19 and by insulating washers for the screws. Insulating material is also placed over the heads of the screws in order to prevent any possibility of electrical connection between the block 17 and the permanent magnet 1. The contact block has an elongated opening vertically through it through which the screw 20 is extended. The screw 20 is threaded into the horizontal arm of the member 18 and serves to clamp the contact block 17 in adjusted position. A screw 21 may be provided in the vertical arm of the member 18 for moving the contact block 17 into adjusted position. The vertical arm of the member 18 is also provided with a screw or binding post 22 to facilitate making circuits connections. A back stop 23 of non-magnetic material is provided and is preferably adjustably mounted on the other pole of the permanent magnet 1. The armatures 2 and 3 are in electrical connection with the frame 5 through the pivot 6, and flexible wires 24 connecting the armatures 2 and 3 to the frame 5 are also provided in order to insure good electrical connection between the armatures 2 and 3 and the frame 5. The wires 22 are secured to the armatures near their pivotal points so as to interfere as little as possible with their freedom of vibration. The frame 5 may be provided with a binding post 25 to facilitate making circuit connections.

Instead of the armatures illustrated in Figs. 1, 2, 3 and 4, which are of hollow square or rectangular section, other forms having similar properties may be employed, as for example, an I section, as is illustrated in Figs. 5 and 6. The opening 10' for the reception of the pivot 6 extends preferably at right angles to the flanges and through the web of the I section at one end of the armature, and at the other end, slots in the flanges parallel to the web are provided, as is shown at 11', 11'. The carbon contact 13' is provided with a divided lower portion adapted to straddle the end of the web of the I section and to be held between the flanges. The slots 11', 11' permit the ends of the flanges to be sprung back to allow the carbon contact to be slipped into place, and it is held in place by the resilient action of the flange ends. Instead of the hollow square or rectangular armatures, and the I section, armatures of channel section may be employed. In all of these forms a large extent of surface is obtained in proportion to the weight of the iron, and in this way lightness and sensitiveness are obtained and the form of the armature is particularly adapted to serve as a path for alternating magnetic flux because of the large extent of surface. Inasmuch as the armatures are freely supported below their centers of gravity without the use of springs, they have no natural tendency to vibrate at fixed rates and are consequently perfectly free to follow variations in the alternating current to be rectified.

In Fig. 7, one of my improved rectifying devices is shown connected in a system in which alternate half waves of alternating current are utilized. In this figure, alternating current mains are shown at 30 and 31. One terminal of the coil 4 is connected to one of the alternating current mains 30 by a conductor 32, and the other terminal of the coil 4 is connected to the other main 31 by the conductor 33. An adjustable condenser 26 is preferably connected in series with the coil 4 and is shown inserted in the conductor 33. The stationary contact 17 is connected to one side of the alternating current circuit 31 by means of a conductor 35, and the frame of the device is connected to the other side of the alternating current circuit as by means of the conductor 36. In the circuit containing the contact 17 the direct current translating device or devices are connected. I have illustrated as such a device a storage battery 37, and also an adjustable rheostat 38 inserted in the connection 36.

The mode of operation of my improved rectifying device is as follows:—Reversals of current occur in the coil 4 and an alternating flux is set up in the armatures 2 and 3, thereby making the upper ends of the armatures alternately north and south poles. Furthermore, when the upper ends of the armatures are of north polarity, the south pole of the permanent magnet is strengthened and the north pole weakened, and when the upper ends of the armatures are of south polarity, the north pole of the permanent magnet is strengthened and the south pole is weakened. As a result, the armatures are vibrated in synchronism with the alternating current flowing through the coil 4. When the contacts 12 and 13 are in contact with the contact 17, a circuit is established from the alternating current main 31 through the conductor 35, contact 17, contacts 12 and 13, armatures 2 and 3 to the frame 5, binding post 25 and the conductor 36, storage battery or other direct current translating device 37, rheostat 38, to the other side of the alternating current circuit 30. This condition of affairs continues during one half wave of the alternating current. During the succeeding half wave, the circuit is broken at the contacts 12, 13 and 17. In this manner uni-directional current is supplied to the storage battery or other direct current translating device 37. The adjustable condenser 26 in series with the coil 4 is employed to advance the phase of the current in the coil in order to compensate for the inertia of the armatures and to cause the circuit to be broken at the proper times to avoid sparking. The adjustable rheostat 38 is employed to regulate the current supplied to the direct current translating device.

In Fig. 8 I have illustrated a system in which my improved rectifiers are employed, and in which both half waves of alternating current are utilized. Referring to this figure, at 40 and 41 are shown alternating current mains across which the primary 42 of the transformer is connected. Conductors 44 and 45 are connected to the end terminals of the secondary 43 of the transformer and conductor 46 is connected to the middle point of the secondary 43. In this system I have illustrated two rectifying devices A and B of the character hereinbefore described. The actuating coil 4^A of the rectifying device A is connected across the conductors 44 and 45 by conductors 47 and 48, and in this circuit an adjustable condenser 49 is connected. The actuating coil 4^B of the rectifying device B is connected across the conductors 44 and 45 by conductors 50 and 51 and in this circuit is included an adjustable condenser 52. The condensers 49 and 52 serve the same purpose as the condenser 26 shown in Fig. 7. The stationary contact 17^A of the rectifying device A is connected to conductor 45 by a conductor 53, and the vibrating contacts of the device A are connected through the armatures and frame to a conductor 54 which is connected to a wire 57 leading to a storage battery or other direct current translating device 37. The stationary contact 17^B of the rectifying device B is connected to the conductor 44 by conductor 55, and the vibrating contacts of rectifying device B are connected through the armatures and frame and by means of the conductor 56 to the conductor 57 leading to the storage battery 37. The other terminal of the storage battery 37 is connected through an adjustable rheostat 38 to the conductor 46 and the middle point of the secondary 43. As illustrated, the two devices A and B are identical, the right hand terminal of the actuating coil of one being connected to one side of the alternating current circuit, and the right hand terminal of the actuating coil of the other being connected to the other side of the alternating current circuit. By this system of connections, during the operation of the devices, all the contacts in one rectifying device are closed when those of the other rectifying device are opened, and vice versa. The circuits in this system may be traced as follows:—Assuming that current tends to flow through the transformer secondary 43 from the conductor 45 to the conductor 44, current will flow through conductor 46 from the middle point of the secondary of the transformer, regulating rheostat 38, storage battery 37, conductor 57, conductor 54, frame, armatures and contacts of rectifying device A, including the stationary contact 17^A, conductor 53, conductor 45, and back to an end terminal of the transformer. At this time the rectifying circuit of the rectifying device B is open, and therefore no current flows through it. When the current reverses in the transformer, the rectifying circuit of rectifying device A is opened and current flows from the center of the secondary of the transformer through conductor 46, regulating rheostat 38, storage battery 37, conductor 57, conductor 56, frame, armatures, and contacts of rectifying device B, including stationary contact 17^B, conductor 55, conductor 44, and back to the other end terminal of the secondary of the transformer. It is to be noted that the rectifying circuit through the device A is opened and the rectifying circuit through the device B is closed during one half wave, and during the succeeding half wave the rectifying circuit of the device A is closed and the rectifying circuit of the device B is opened. This result may also be obtained by using rectifying devices in which the permanent magnets are arranged oppositely with respect to their polarities, and having the corresponding ends of the actuating coils connected to the same side of the alternating current circuit, or by having the permanent magnets arranged similarly, as in Fig. 8, and by having the actuating coil of one device wound in the opposite direction to that of the other, and having the corresponding ends of both coils connected to the same side of the alternating current circuit.

By the provision of extremely light armatures so mounted as to have no natural periods of vibration, I am enabled to secure great sensitiveness of operation, and the armatures in their movements follow closely the variations of the current in the line and actuating coils. By the employment of carbon contacts having comparatively large contact surfaces, the current carrying capacity of the apparatus is materially increased, good contact is always insured, sparking is reduced to a minimum, and the sticking or freezing of contact points is avoided. Where metal contacts having relatively large contact surfaces are employed in apparatus of this character, it is found that projections are formed on the contact faces which reduce the contact areas and interfere materially with the operation of the apparatus. In my improved construction, the carbon contacts may be easily removed from the armatures, when it is found necessary or desirable to remove the same for renewal or for other purposes.

Having now described my invention, what I claim as new therein and desire to protect by Letters Patent is as follows:—

1. In an alternating current rectifier, a tubular armature member of resilient magnetic material having thin walls and adapted to receive a contact member in an open end thereof, one or more of said walls being slotted at said open end to facilitate the introduction of said contact member into said open end and to retain the same in place after its introduction, substantially as described.

2. In an alternating current rectifier, an elongated armature member of magnetic material having thin walls, one or more of said walls being slotted at one end thereof, said member being adapted to receive a contact interfittingly therewith at said end, and a carbon contact having a portion received in said end of said armature member interfittingly therewith and having an offset portion provided with a contact face, substantially as described.

3. In an alternating current rectifier, an elongated armature of resilient material having thin walls angularly disposed with respect to each other and provided with a carbon contact having a portion thereof in interfitting relation to one end of the armature and retained in position by the resilience of the armature material, substantially as described.

4. In an alternating current rectifier, the combination of a magnet having a gap therein, an elongated armature member having thin walls angularly disposed with respect to each other and provided with a contact inserted in the end thereof, said armature being mounted to vibrate freely in said gap, a contact stationarily mounted with respect to said magnet and coöperable with said first mentioned contact, and means for producing an alternating current flux in the armature in synchronism with the alternating current to be rectified, substantially as described.

This specification signed and witnessed this 5th day of June, 1912.

DONALD M. BLISS.

Witnesseth:
HENRY LANAHAN,
ANNA R. KLEHM.